(12) United States Patent
Twerdochlib

(10) Patent No.: US 8,151,647 B2
(45) Date of Patent: Apr. 10, 2012

(54) APPARATUS FOR MONITORING BLADE VIBRATION WITH AN IMAGING FIBER OPTIC RIBBON PROBE

(75) Inventor: Michael Twerdochlib, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 603 days.

(21) Appl. No.: 12/360,909

(22) Filed: Jan. 28, 2009

(65) Prior Publication Data

US 2010/0074727 A1 Mar. 25, 2010

Related U.S. Application Data

(60) Provisional application No. 61/099,643, filed on Sep. 24, 2008.

(51) Int. Cl.
*G01H 11/00* (2006.01)
(52) U.S. Cl. .......... 73/661; 73/593; 73/660; 702/56
(58) Field of Classification Search .......... 73/661, 73/593, 660, 583, 584, 662; 702/56, 115, 702/182–185, 188; 415/118, 119, 1; 416/1, 416/5, 61
See application file for complete search history.

(56) References Cited

U.S. PATENT DOCUMENTS

| | | | |
|---|---|---|---|
| 4,373,804 A * | 2/1983 | Pryor et al. | 356/3.07 |
| 4,914,953 A * | 4/1990 | Viscovich | 73/660 |
| 5,557,099 A | 9/1996 | Zielinski et al. | |
| 6,037,581 A | 3/2000 | Zorner | |
| 6,587,207 B2 | 7/2003 | Hessert et al. | |
| 6,678,060 B2 | 1/2004 | Heyworth | |
| 7,341,428 B2 | 3/2008 | Twerdochlib | |
| 7,723,435 B2 * | 5/2010 | Maruo et al. | 525/92 B |
| 7,836,772 B2 * | 11/2010 | Twerdochlib | 73/661 |
| 2007/0018457 A1 * | 1/2007 | Llorente Gonzalez | 290/44 |
| 2010/0074572 A1 * | 3/2010 | Zheng et al. | 385/13 |
| 2010/0076703 A1 * | 3/2010 | Twerdochlib | 702/56 |
| 2010/0211343 A1 * | 8/2010 | Thomas et al. | 702/70 |

FOREIGN PATENT DOCUMENTS

| | | |
|---|---|---|
| DE | 4344650 C1 | 1/1995 |
| EP | 0586288 A1 | 3/1994 |
| JP | 05164602 A | 6/1993 |

OTHER PUBLICATIONS

Henry Jones, "Shedding light on vibration"; Mechanical Engineering, Nov. 1, 1996; pp. 94-97; XP000643790.

* cited by examiner

*Primary Examiner* — Gary F. Paumen

(57) ABSTRACT

A method and apparatus for monitoring blade vibrations in a turbine engine having blade tip target portions associated with blades. An illumination conduit including a plurality of optical fibers conveys light from a light source to a transmission end of the optical fibers where the light is focused to define an axially elongated projected image. The blade tip target portions pass through the projected image and reflect light to a receptor array defined by receptor ends of a plurality of optical fibers forming an imaging conduit for conveying the reflected light to a sensor array. An imaging end of the imaging conduit radiates an image onto the sensor array that is identical to the reflected light image received at the receptor array to track tangential and axial movement of a predetermined point on the target portion.

20 Claims, 5 Drawing Sheets

APPARATUS FOR MONITORING BLADE VIBRATION WITH AN IMAGING FIBER OPTIC RIBBON PROBE

CROSS-REFERENCE TO RELATED APPLICATIONS

This application claims the benefit of U.S. Provisional Application No. 61/099,643, filed Sep. 24, 2008, which is incorporated herein by reference.

FIELD OF THE INVENTION

The present invention is related to turbine blade vibration monitoring and, more particularly, to a fiber optic ribbon probe for use in detecting blade passing events during blade vibration monitoring.

BACKGROUND OF THE INVENTION

A high speed turbo machine, such as, for example, a steam or gas turbine, generally comprises a plurality of blades arranged in axially oriented rows, the rows of blades being rotated in response to the force of a high pressure fluid flowing axially through the machine. Due to their complex design, natural resonant mechanical frequencies of the blades may coincide with or be excited by certain blade rotational speeds and rotational harmonics thereof. To prevent excessive vibration of the blade about its normal position, prudent design practice dictates that the blades be constructed such that the frequencies of the lowest modes fall between harmonics of the operating frequency of the turbine. In addition, the blades may be excited by non-synchronous forces such as aerodynamic buffeting or flutter. In order to avoid the vibration exceeding certain levels and setting up objectionable stresses in the blades, it is common to monitor the vibrations of the blades, both during the design and testing of the turbine and during normal operation of the turbine. For example, it is known to use non-contacting proximity sensors or probes to detect blade vibrations. The probes detect the actual time-of-arrival of each blade as it passes each probe and provide corresponding signals to a blade vibration monitor system (BVM). Small deviations due to vibration are extracted, from which the BVM may determine the amplitude, frequency, and phase of the vibration of each blade.

The measured vibration amplitude is highly dependent on correct positioning of the sensor above the blade target, which may comprise a target affixed to the blade, a feature of the blade, or the blade tip itself. In a typical measurement, the probes may be positioned to sense the passage of a leading edge or trailing edge of the blades.

In one known system of obtaining time-of-arrival data from rotating blades, a five lens laser line probe spreads a laser light into a line that spans a portion of the blade tip to be certain that either the leading blade tip edge or trailing blade tip edge is detected as the time-of-arrival. A pulse of light is produced by the laser light reflected from the tip edge as it passes the probe, and is received by the probe. If the probe is positioned over the leading edge, a leading pulse edge indicates the arrival of the leading blade tip edge, providing a vibration measurement at the leading tip edge. If the probe is positioned over the trailing blade tip edge, a falling pulse edge indicates the leaving trailing blade tip edge, providing a vibration measurement at the trailing tip edge. Such a measurement requires that the line of laser light overhang the leading or trailing edge to ensure that the leading or trailing edge is intercepted, and additionally requires that the probe for receiving the reflected light be accurately located to ensure that the focal point for the probe is located at or near the leading or trailing edge of the blade in that a "missed edge" condition will not be detected by this probe configuration The difficulty in properly aligning a probe is increased by axial movements of the blades during operation, such as may occur as the rotor spins up or down, as the turbine warms up and cools down, as the load on the turbine changes, and due to torsional movements of the blades. Accordingly, it is desirable to provide a BVM probe that is capable of providing time-of-arrival data substantially unaffected by axial movements of the blades.

SUMMARY OF THE INVENTION

In accordance with one aspect of the invention, a blade vibration monitor is provided for monitoring blade vibration in a turbine engine including a blade structure comprising a plurality of blades and blade tip target portions associated with the blades, and a casing surrounding the blade structure. The blade vibration monitor comprises a light source and an illumination conduit having a transmission end for locating adjacent to an interior portion of the casing for projecting an image of the light source onto the blade structure in the turbine engine, the projected image comprising an axially elongated projected image. A processor is provided for processing reflected light images from a blade tip target portion corresponding to a blade passing event. An imaging conduit is provided comprising a receptor end defined by an array of light receptor channels, the receptor end being located adjacent an interior portion of the casing for receiving reflected light images from the blade tip target portions and having an axial component transverse to a movement path of the blades. The processor includes a sensor array having a plurality of array components for imaging locations of the light receptor channels corresponding to locations along the axially elongated projected image. The processor identifies axial locations on a blade during each blade passing event.

In accordance with another aspect of the invention, a method of providing a blade vibration monitor is described for monitoring blade vibration in a turbine engine including a blade structure comprising a plurality of blades having blade tip target portions and supported for rotation, and including a casing surrounding the blade structure. The method comprises providing an illumination conduit connected to a light source and emitting a line of light into the casing to define an axially elongated image from the illumination conduit; passing the blade tip target portions along a path of travel through locations corresponding to the axially elongated projected image and forming reflected light images at locations on the blade tip target portions to define blade passing events; receiving the reflected light images at a receptor end of an imaging conduit defined by a plurality of optical fibers forming a receptor array, the reflected light corresponding to a plurality of locations along the axially elongated projected image as each blade tip target portion moves past the line of light; conveying the reflected light images through the imaging conduit from the receptor array to an imaging array at an imaging end of the imaging conduit; and imaging the reflected light images from the imaging array onto a sensor array for identification of axial and tangential locations of at least one predetermined point on the blade tip target portions.

In accordance with a further aspect of the invention, a method of providing a blade vibration monitor is described for monitoring blade vibration in a turbine engine including a blade structure comprising a plurality of blades having blade tip target portions, and a casing surrounding the blade structure. The method comprises continuously winding a strand of optical fiber about a support structure, forming a plurality of windings in contact with each other; adhering the plurality of windings to one another along a predetermined length of the windings to define an adhered section of optical fibers; severing the adhered section of optical fibers transverse to the length of the optical fibers at a location intermediate the ends of the predetermined length to form severed ends, one of the severed ends defining a receptor end; locating the receptor end adjacent to an interior portion of the casing; and locating an imaging end of the optical fibers, opposite the receptor end, at a processor for detecting light received at the receptor end.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
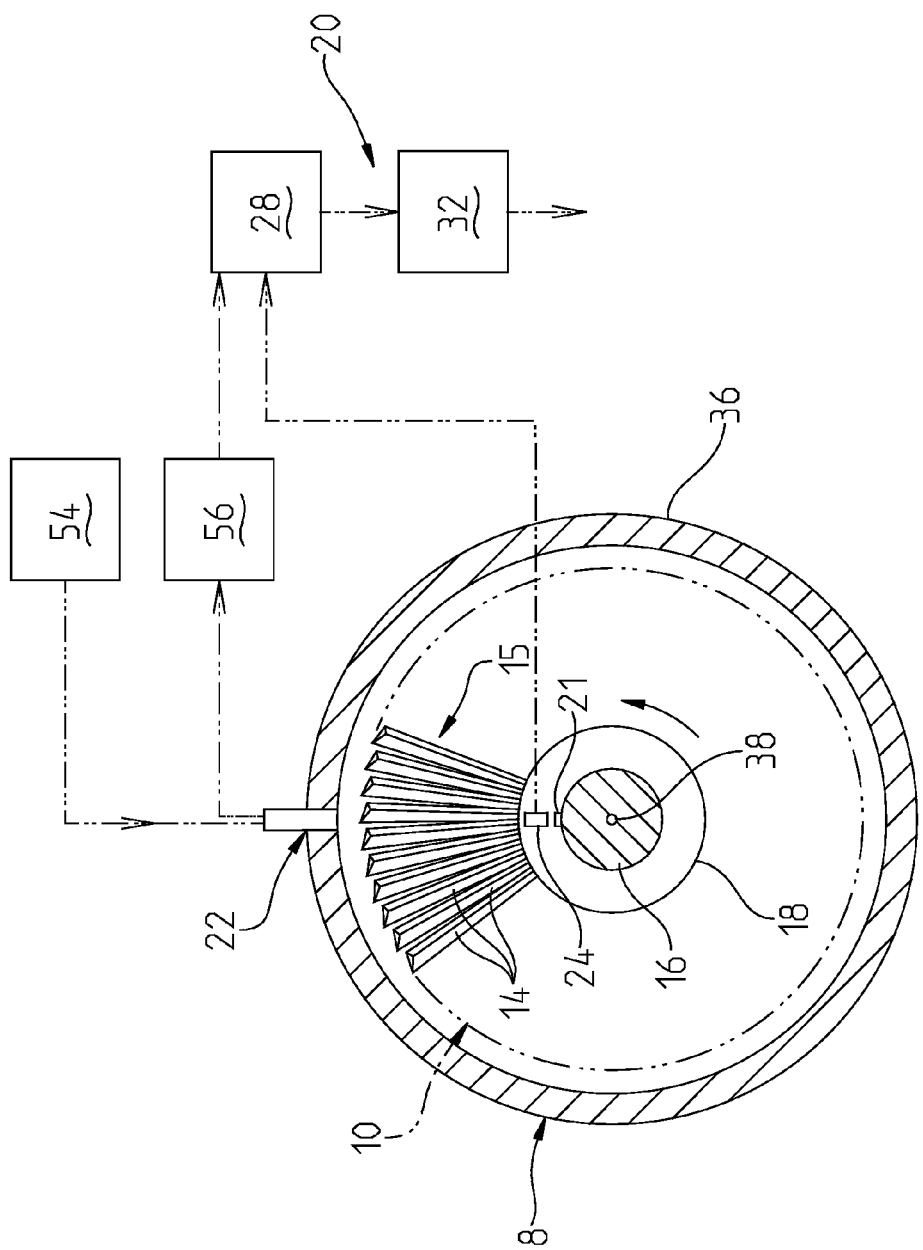
FIG. 1 is a diagrammatic view illustrating a turbine and a blade vibration monitor system incorporating the present invention.

FIG. 1 diagrammatically illustrates a turbine 8 including an unshrouded blade row 10 in which the method and apparatus of the present invention may be employed in a blade vibration monitoring system to monitor vibrations of turbine blades 14. The turbine blades 14 are connected to a rotor 16 by means of a rotor disk 18 and form a blade structure 15 within the turbine 8.

A turbine blade vibration monitoring system (BVM) 20 is also shown in FIG. 1. The system 20 includes a turbine blade probe 22 mounted to a casing 36 of the turbine 8 for monitoring the vibration of the turbine blades 14. In accordance with an embodiment of the invention, plural probes 22 may be provided in circumferentially spaced relation to each other, as is further described below with reference to FIG. 9.

As is further illustrated in FIG. 1, a reference sensor 24 is additionally provided. The reference sensor 24, in conjunction with an indicia 21 on the rotor 16, is operable to provide a once-per-revolution (OPR) reference pulse signal. Signals from the probe 22 and the signals from the reference sensor 24 are provided as inputs to a blade vibration processor 28. The output of the blade vibration processor 28 is input to a signal analyzer 32 which may perform signal conditioning and analysis.

Figure 2:
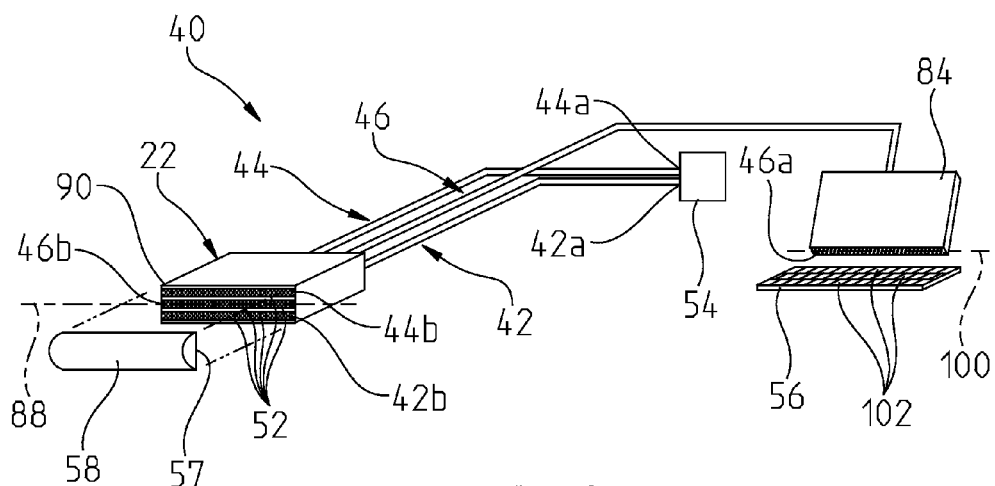
FIG. 2 is a partially exploded perspective view of a fiber optic ribbon probe constructed in accordance with the present invention.

Referring to FIG. 2, the probe 22 is a component of an imaging fiber optic ribbon probe (IFORP) 40 including a first illumination conduit 42, a second illumination conduit 44, and an imaging conduit 46. The first and second illumination conduits 42, 44 and the imaging conduit 46 are each formed of a plurality or bundle of optical fibers 52. Each bundle of optical fibers 52 is formed into a fiber optic ribbon for incorporation in the probe 22, as will be described further below.

The BVM 20 further includes an illumination or light source 54 which, in the preferred embodiment, may comprise a laser light source. For example, a continuous laser light source, or a chopped (on/off) laser light source may be provided. A chopped laser light source, operated at a high fixed frequency may provide a frequency/phase sensitive detection of reflected light pulses received by the probe 22, as well as provide a substantial reduction in signal noise.

The first and second illumination conduits 42, 44 comprise respective illuminated ends 42a, 44a located at the light source 54 for receiving light energy to be conducted though the illumination conduits 42, 44. The opposite ends of the illumination conduits 42, 44 comprise fiber optic ribbon transmission ends 42b, 44b for locating adjacent to an interior portion of the casing 36 and projecting light toward the blades 14 during a BVM process as the blades 14 rotate about a rotational axis 38 of the rotor 16.

Similarly, the imaging conduit 46 includes opposing ends comprising an imaging end 46a located adjacent to a sensor array 56, and a fiber optic ribbon receptor end 46b for locating adjacent to the interior portion of the casing 36 and receiving reflected light during blade passing events as the blades 14 rotate past the probe 22. Although illustrated as a separate element, the sensor array 56 may comprise a component of the processor 28 and receives an image of the reflected light from the radiating end 46a. The sensor array 56 provides an output corresponding to the imaged reflected light for use by the processor 28 in response to blade passing events, as is described further below.

Figure 3:
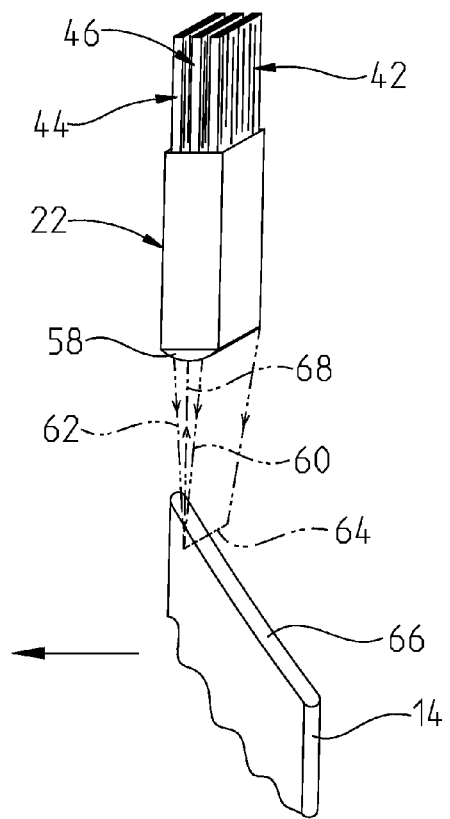
FIG. 3 is a perspective view of a receptor end of the fiber optic ribbon probe of FIG. 2.

FIG. 3 further illustrates the probe 22 in relation to a blade 14 (shown diagrammatically). The probe 22 includes a very small cylindrical lens 58 that is attached to the transmission ends 42b, 44b of the illumination conduits 42, 44 and to the receptor end 46b of the imaging conduit 46. The cylindrical lens 58 focuses the light conveyed from the light source 54 through the illumination conduits 42, 44, and emitted from the transmission ends 42b, 44b, as converging lines of light 60, 62 defining an axially elongated projected image, as depicted at 64 in FIG. 3. The elongated projected image 64 is focused to a location in space coinciding with a location though which a blade tip target portion 66 for each rotating blade 14 passes during rotating movement of the rotor 16. The location of the elongated projected image 64 also comprises a focal line for the center of the lens 58, and light reflected from the target portion 66 forms a reflected light image 68 that is focused by the cylindrical lens 58 onto the receptor end 46b of the imaging conduit 46.

It should be noted that the blade tip target portion 66 of the illustrated embodiment comprises the blade surface defined by the radially outer tip of each of the blades 14. However, the target portions may comprise separately formed members (not shown) that may be attached at the outer circumference of the blade structure 15, and which are capable of providing a reflected light signal, indicating passage of the target portions past the probe 22.

Figure 4:
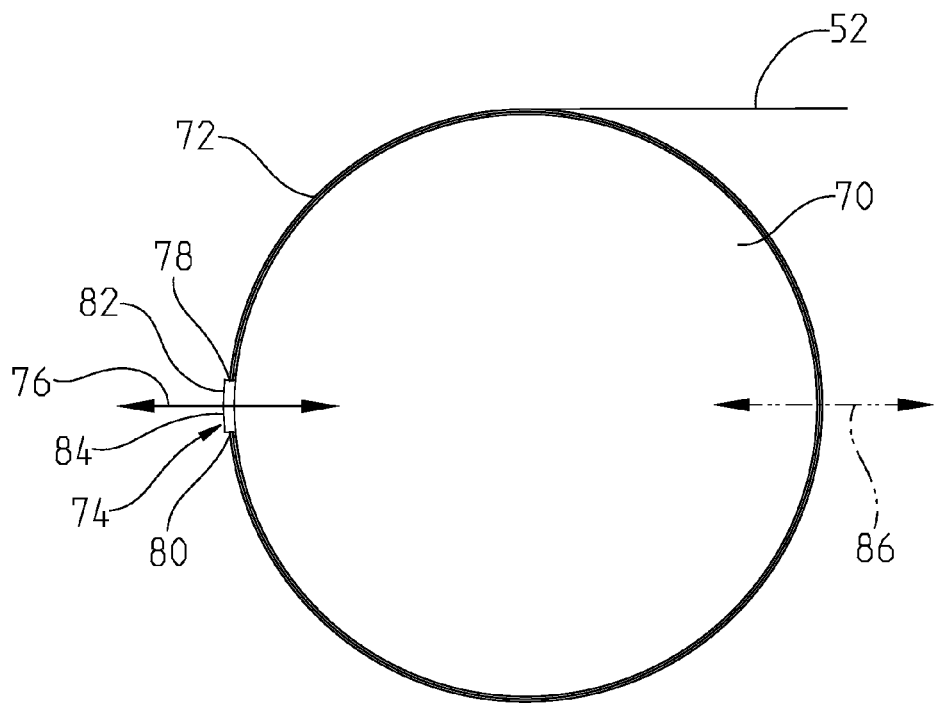
FIG. 4 is diagrammatic view illustrating construction of the fiber optic ribbon probe.

Referring to FIG. 4, a construction method for use in forming the conduits 42, 44, 46 for the IFORP 40 is illustrated. For purposes of this description, the construction of only the imaging conduit 46 and its associated imaging ribbon end 46a and receptor ribbon end 46b is described in detail. The imaging conduit 46 is formed around a support structure 70 which is illustrated as a drum-like structure, but may comprise any circuitous structure for supporting multiple windings of optical fibers 52. A strand of hair-like optical fiber 52, e.g., an optical fiber 52 having a diameter of approximately 125 μm, is continuously wound about the support structure 70, with the windings of optical fibers 52 located in close contact with each other. The optical fiber 52 is wound to form a ribbon-like structure 72 extending around the support structure 70. A predetermined length of the plurality of windings forming the ribbon-like structure 72 is cemented together to define a bonded or adhered section 74 of the optical fibers 52.

Figure 5:
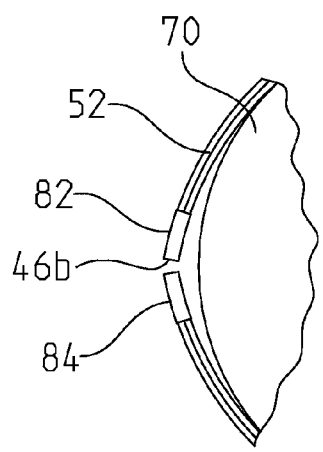
FIG. 5 is an enlarged diagrammatic view of the construction of the fiber optic ribbon probe illustrating severed ends formed by severing a bonded section of optical fiber windings.
Figure 6:
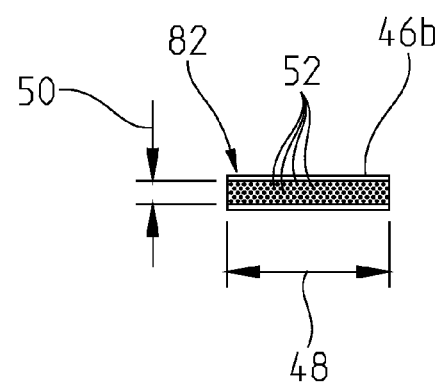
FIG. 6 is an end view of a severed end of the bonded section for the fiber optic ribbon probe.
Figure 7:
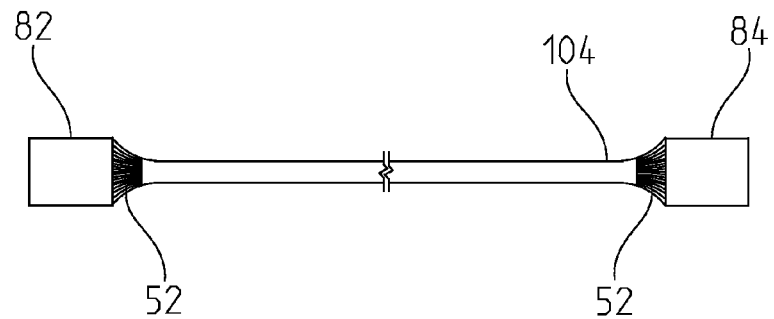
FIG. 7 is a plan view of a completed imaging conduit.

Subsequent to formation of the adhered section 74 of the optical fibers 52, the adhered section 74 is severed transverse to the length of the optical fibers 52, i.e., transverse to the direction of elongation of the optical fibers 52, at a location intermediate the ends 78, 80 of the adhered section 74, as depicted by arrow 76. Preferably, the adhered section 74 is severed at a mid-way point between the ends 78, 80 of the section 74 to form two bonded fiber optic ribbons 82, 84, as seen in FIG. 5. The severed surfaces of the bonded fiber optic ribbons 82, 84 are polished to provide optically transmissive surfaces, where the polished surface of the bonded fiber optic ribbon 82 defines the receptor end 46b of the imaging conduit 46, and the polished surface of the bonded fiber optic ribbon 84 defines the imaging end 46a. By way of example, each of the bonded fiber optic ribbons 82, 84 may be configured as a narrow rectangular optical array having a length or major dimension 48 of approximately 0.750 inch (1.905 cm) and a thickness or minor dimension 50 of approximately 0.062 inch (0.157 cm). FIG. 7 illustrates the completed imaging conduit 46 having opposing rectangular bonded fiber optic ribbons 82, 84, and including a sheath 104 enclosing the optical fibers 52 between the bonded fiber optic ribbons 82, 84.

Figure 8:
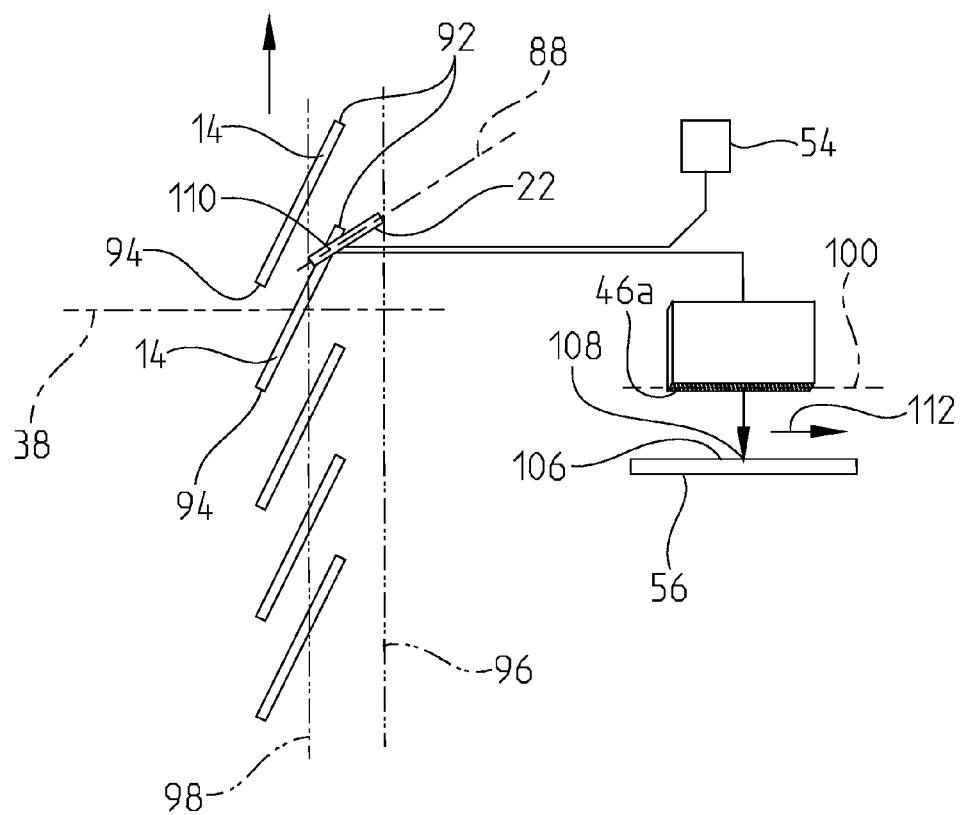
FIG. 8 is a diagrammatic plan view illustrating detection of blade passing events using the imaging fiber optic ribbon probe.

Since the imaging end 46a and the receptor end 46b are formed at a common severed location 76 of the adhered section 74, there is a one-to-one correspondence between the optical fiber ends forming a receptor array at the receptor end 46b and the optical fiber ends forming an imaging array at the imaging end 46a. That is, for each end of an optical fiber 52 in the receptor end 46b, there is an end of the same optical fiber 52 in the imaging end 46a, where the location of the end of the optical fiber in the imaging end 46a corresponds exactly to the location of the end of the optical fiber in the receptor end 46b. Hence, light reflected from the target portion 66 and imaged onto the optical fibers 52 of the receptor end 46b will produce a corresponding, substantially identical, image at the opposing end of the optical fibers 52 at the imaging end 46a. In particular, as light is imaged to the receptor end 46b at specific locations along a major axis 88 of the probe 22 (see FIG. 2), the optical fibers 52 will operate as individual light receptor channels for imaging the light to corresponding locations along a major axis 100 of the imaging end 46a (FIGS. 2 and 8).

The illumination conduits 42, 44 may be formed using a construction process similar to that described above with reference to FIGS. 4 and 5, where the adhered ends 82, 84 define the transmission ends 42b, 44b for locating in the probe 22. However, in the process for forming the illumination conduits 42, 44, an additional severing operation is performed where the ribbon-like structure 72 is severed at a location mid-way between the bonded fiber optic ribbon ends 82, 84, i.e., at the location indicated by dotted line 86, to define two separate ribbon structures, such as is described in patent application U.S. Ser. No. 12/360,897 entitled METHOD AND APPARATUS FOR MONITORING BLADE VIBRATION WITH A FIBER OPTIC RIBBON PROBE, the entire disclosure of which is incorporated herein by reference. For example, the ribbon-like structure 72 may be severed at 86 such that the ribbon end 82 and associated optical fibers 52 form the first illumination conduit 42, with the polished optical fiber ends of the ribbon end 82 forming the first transmission end 42b. Similarly, the ribbon end 84 and associated optical fibers 52 may form the second illumination conduit 44, with the polished optical fiber ends of the ribbon end 84 forming the second transmission end 44b. The non-bonded severed ends of the optical fibers 52 formed at the severing location 86 for each of the illumination conduits 42, 44 may be gathered together to define the illuminated ends 42a, 44a of the respective illumination conduits 42, 44. For example, the non-bonded severed ends for each of the illumination conduits 42, 44 may be gathered to form a circular shape to define the illuminated ends 42a, 44a for receiving light from the light source 54 and transmitting it to through the illumination conduits to the transmission ends 42b, 44b. It should be noted that the illuminated ends 42a, 44a are not limited to any particular shape, and may be formed into any shape that facilitates coupling of the light from the light source 54 to the illuminated ends 42a, 44a.

Alternatively, each of the illumination conduits 42, 44 may be formed by the same construction technique described for the imaging conduit 46. Specifically, each of the opposed ends 42a, 42b and 44a, 44b of the respective illumination conduits 42, 44 may be defined by a section of adhered fibers in a narrow rectangular configuration.

The probe 22 is formed by positioning the receptor end 46b in sandwiched relation between the transmission ends 42a, 44a, as may be seen in FIG. 2. The transmission ends 42b, 44b are preferably adhered or bonded onto either side of the receptor end 46b to configure the probe 22 as a narrow rectangle defining the major axis 88. Additionally, a casing 90 (FIG. 2) may be provided surrounding the sides of the transmission ends 42b, 44b and the receptor end 46b to define an outer surface for the probe 22.

A flat face 57 of the cylindrical lens 58 is bonded directly to the polished transmission and receptor end surfaces 42b, 44b and 46b. The cylindrical lens 58 is configured as a narrow rectangle to substantially match the combined dimensions of the end surfaces 42b, 44b, 46b. For example, the cylindrical lens 58 may have a major dimension of approximately 0.750 inch (1.905 cm) and a minor dimension of approximately 0.200 inch (0.508 cm). Hence, the outer lengthwise edge portions of the cylindrical lens 58 are positioned over the transmission ends 42b, 44b to focus transmitted light from the optical fibers 52 of the illumination conduits 42, 44 at a predetermined angle inwardly to the location 64 of the axially elongated projected image 64, and the central portion of the cylindrical lens 58 is positioned over the receptor end 46b to focus light from the location 64 into the optical fibers 52 of the imaging conduit 46.

In an alternative configuration of the probe 22, only one illumination conduit 42 or 44 may be provided having one of the transmission ends 42b or 44b in side-by-side relation with the receptor end 46b of the imaging conduit 46. As in the previously described embodiment, a cylindrical lens 58 may be attached to the polished ends of the optical fibers 52 for the one transmission end 42b or 44b and the receptor end 46b to focus light to and from the location of the axially elongated projected image 64.

As noted above, the imaging end 46a is located adjacent to the sensor array 56. The sensor array 56 is formed with a plurality of array components, generally depicted diagrammatically by grid locations 102 in FIG. 2. The array components 102 comprise light sensitive elements for receiving images corresponding to the light channel locations defined by the optical fibers 52 at the imaging end 46a, and for providing an output to the processor 28 corresponding to reflected light imaging locations along the axially elongated projected image 64 intersected by the target portions 66 and received at the receptor end 46b. In a preferred embodiment, the sensor array 56 comprises a high speed CCD camera having a shutter speed in the sub-microsecond range and having a very high CCD array pixel count. The imaging end 46a of the imaging conduit 46 is directed to the CCD array of the camera, and the camera is configured to track a specified point on a sweeping image produced at the receptor end 46b and transmitted to the imaging end 46a. That is, the sensor array 56 (i.e., CCD camera) is capable of identifying specific pixel locations and a corresponding time at which light from the imaging end 46a is received/sensed at each pixel location. Thus, the processor 28 receives data comprising the precise time that a particular pixel, or group of pixels, corresponding to a particular location on the target portion 66 is illuminated with each revolution of the rotor 16.

The collection of data from the target portion 66, and association of this data with a particular time or "time stamp" during blade passing events, is preferably performed by one of two distinct processes. In a first "burst exposure" process for collecting data, identification of each blade 14 as it passes the probe 22, and corresponding to a blade passing event, is performed by triggering the sensor array 56 (CCD camera) based on a clock signal of the BVM and with reference to the OPR signal provided by the reference sensor 24. For example, a system operating with a 96 MHz BVM clock and having a 3600 rpm rotor speed would produce 96,000/60=1,600,000 counts per revolution. As with conventional known BVM processing techniques, the BVM may determine that a specific blade 14 will be at a particular location in its rotation based on the rotor speed determined from the OPR which, for the present invention, enables identification of a particular clock count window during which any given blade 14 is within the view of the probe 22. The sensor array 56 (CCD camera) is triggered during this known clock window for each blade passing event to form multiple camera exposures providing data on the location of each target portion 66 (blade tip). By collecting the camera exposures within a predetermined clock window corresponding to a given blade 14 over a plurality of revolutions, the location of the target portion 66 (blade tip) is known or identified for a series of camera exposures. Each camera exposure is tagged with its associated triggering clock count (camera "shutter" trigger time). Accordingly, by triggering the sensor array 56 (CCD camera) multiple times, e.g., at the BVM clock frequency, for each blade passing event (or clock window) based on the sensed OPR position, the BVM can record time stamped data for the blade passing events of each blade 14, providing information on any, as well as all, points on the target portion 66 (blade tip) imaged by the probe 22 for each blade passing event defined by the clock window.

In a variation of the burst exposure process described above, a second probe (not shown) similar to the probe 22 may be provided as a second receiver channel at a location where the leading edge 92 of the blade 14 will pass the second probe prior to passing the event sensing probe 22 to thereby produce a trigger at the blade's leading edge 92. The second probe may be provided in a manner similar to the two probe sensing arrangement described in the above-referenced patent application U.S. Ser. No. 12/360,897 entitled METHOD AND APPARATUS FOR MONITORING BLADE VIBRATION WITH A FIBER OPTIC RIBBON PROBE. The triggering second probe is used to start a burst or series of high speed camera exposures to the sensor array 56, which may be triggered by the 96 MHz BVM clock or which may be triggered by a different clock operating at a selected frequency. As with the previously described data collection process, the triggered series of camera exposures may track any spot on the target portion 66, i.e., on the blade tip, as measured from the blade's leading tip edge 92. Further, identification of the particular blade 14 associated with a blade passing event is performed with reference to the OPR signal as in the first described burst exposure data collection process.

In a second "programmed (smart) illumination" process for collecting data, the light (i.e., lased light) from the light source 54 to the event sensing probe 22 may be chopped at a clock frequency, which may be referenced to the BVM clock frequency or may be some other selected frequency. Unlike the use of a chopped light signal to reduce noise, as mentioned above, the present use of a chopped light signal is used to provide multiple images of a single target portion 66 on a single exposure of the sensor array 56 (CCD camera). That is, an effective camera "shutter" is kept open during each blade passing event. It should be noted that the sensor array 56 (CCD camera) does not actually include a shutter, but includes an electronic equivalent such that it may be operated to receive and retain a series of collected received images over time to produce a single exposure or blade passing event image of the entire target portion 66 (blade tip) imaged under the event sensing probe 22. A triggering second probe (not shown) may be used to trigger a base start time for each blade 14 and during each revolution, where the base start time is used to start the light chop. It should be noted that the triggering second probe produces a quasi-continuous light image 64 in that the light from this triggering probe is continuously on, but is extinguished as soon as the leading edge trigger occurs. The exposure or blade passing event image produced by this process comprises a series of dots that are equally spaced in time corresponding to locations along the entire target portion 66 (blade tip) that are intermittently illuminated at the light chopping frequency.

Although the triggering second probe is described as being separate from the event sensing probe 22, both probe functions may be combined into a single probe, i.e., combined into the event sensing probe 22. In such an arrangement, the source light 60, 62 transmitted from the probe 22 will be continuously on until the blade's leading edge 92 is sensed, at which time the continuous light is extinguished and the base start time is triggered to provide the source light 60, 62 as a chopped light source.

It may be noted that in any of the above data collection processes, the target portion 66 may be modified to facilitate detection of particular points along the target portion 66. For example, the target portion 66 may be formed as a blackened, substantially non-reflective blade tip surface, and a series of equally spaced reflective stripes may be provided on the blade tip surface as indicators of particular equally spaced locations along the target portion 66.

Referring to FIG. 8, a method of using the IFORP 40 to provide signals to the BVM 20 includes locating the probe 22 over at least one of the leading edge 92 of the blade 14 or over the trailing edge 94 of the blade 14. Considering a configuration of the system 20 in which the probe 22 is positioned to sense blade passing events corresponding to passage of blade leading edges 92, the probe 22 is positioned such that its major axis 88 extends in a generally axial direction relative to the rotational axis 38. In particular, the orientation of the probe 22 is such that it extends in an axial direction transverse to the target portion 66. The position of the probe 22 is selected such that the axial area spanned by the probe 22, as represented by the area bounded between a first boundary line 96 and a second boundary line 98, overlaps the leading edge 92 of the blade 14 throughout the range of axial movement of the blade 14 during the various operating conditions of the turbine 8.

As the blade 14 rotates and the leading edge 92 passes under the probe 22, the blade tip target portion 66 intersects the line of light comprising the projected image 64 from the transmission ends 42b, 44b and reflects the light to the receptor end 46b. The optical fibers 52 forming the light receptor channels at the receptor end 46b receive reflected light from a plurality of continuously varying locations along the projected image 64 from the time that the blade leading edge 92 intersects the projected image 64 until the blade tip target portion 66 passes out of the projected image 64. That is, different groups of the optical fibers 52 forming the receptor end 46b will progressively send a light signal to the sensor array 56 once the leading edge 92 intersects the projected image 64. The initial detection of light, detected anywhere along the major axis 88 of the probe 22 as the leading edge of the blade 92 intersects the projected image 64 for each blade passing event, is used as a reference location for identifying all subsequent locations along the target portion 66 during the blade passing event for providing BVM data during multiple rotations of the rotor 16 regardless of axial displacements of the rotor 16 and/or blades 14.

For example, location 106 in FIG. 8 identifies a first illumination location on the sensor array 56 corresponding to the leading edge 92 of the blade 14 initially intersecting the projected image 64, and location 108 identifies a location on the sensor array 56 corresponding to a current location 110 (following the initial illumination) of the intersection of the target portion 66 with the projected image 64. As the blade 14 continues rotating, the light image projected from the imaging end 46a sweeps across the sensor array 56, as indicated by arrow 112. A particular point, e.g., the location 110, along the target portion 66 (i.e., the blade tip) may be tracked and analyzed by the BVM 20 by tracking a particular pixel density on the sensor array 56 for each blade passing event of a blade 14. Specifically, a predetermined number of pixels from the leading edge 92, i.e., from the first illumination 106 on the sensor array 56, is tracked for each blade 14, where the number of pixels from the leading edge 92 (first illumination 106) corresponds to a particular predetermined location along the target portion 66. In this way, the same location on the target portion 66 may be tracked with reference to the leading edge 92 of the blade 14 for multiple revolutions of the rotor 16. The sensor array 56, i.e., the CCD camera, identifies the time-of-arrival of the predetermined target location for each revolution of the rotor 16, to provide data to the processor 28 for determination of tangential vibrational blade movement using known blade vibration analysis techniques.

In addition, axial movement of the blade 14 will cause the location of the first illumination 106, corresponding to the blade's leading edge 92, to appear at different pixel locations on the sensor array 56 throughout multiple revolutions of the rotor 16. As the axial position of the blade 14 and target portion 66 shifts during different blade passing events (multiple rotor revolutions) the location of first illumination 106 (leading edge 92) will shift on the sensor array 56 in a direction parallel to the major axis 100 of the imaging end 46a. This axial shifting of the first illumination 106 on the sensor array 56 will not affect the tangential (time-of-arrival) blade vibration measurement in that each time-of-arrival measurement is referenced to a point on the target portion 66 that corresponds to a predetermined pixel count from the leading edge 92, or first illumination 106 on the sensor array 56, regardless of where the first illumination 106 occurs on the sensor array 56. Hence, axial and tangential movement of the target portion 66 may be measured independently. Further, using the axial and tangential movements of the predetermined location on the target portion 66, orbital movements of each blade 14 may be tracked over multiple revolutions of the rotor 16 to determine an exact orbital mode motion for specific blade tip locations on the blades 14.

As noted above, the probe 22 may be located over the trailing edge 94 to provide time-of-arrival data, as well as axial movement data, for each blade passing event in a manner similar to that described for the probe 22 located above the leading edge 92. Further, the probe 22 may be formed with a length sufficient to extend over both the leading and trailing edges 92, 94 of the blades 14 so as to cover the entire target portion 66, i.e., along the blade tip from the leading edge 92 to the trailing edge 94. Such a probe 22 may be oriented in the axial direction to maximize coverage along the target portions 66 (blade tips) of the blades 14, even through the orientation may result in the probe 22 imaging two target portions 66 at the same time due to the steep cant angle of the blades 14. If two target portions 66 are imaged during the blade passing events, the processor 28 will track the images projected onto the sensor array 56 to identify each blade 14 by tracking the projected image on the array 56 with reference to a repeating pattern indicative of each blade passing event. Specifically, each blade passing event will include a first illumination 106 followed by a continuous sweep of illuminated pixels to a final location. The sensor array 56 (CCD camera) will track each complete sweep across the array 56 as a blade passing event. This will appear as two dots projected onto the array 56, where an "older" dot from a first blade would appear as a right most dot on the array 56 in FIG. 8, and a "newer" dot from the following or subsequent blade 14 would appear as a left most dot on the array in FIG. 8.

Figure 9:
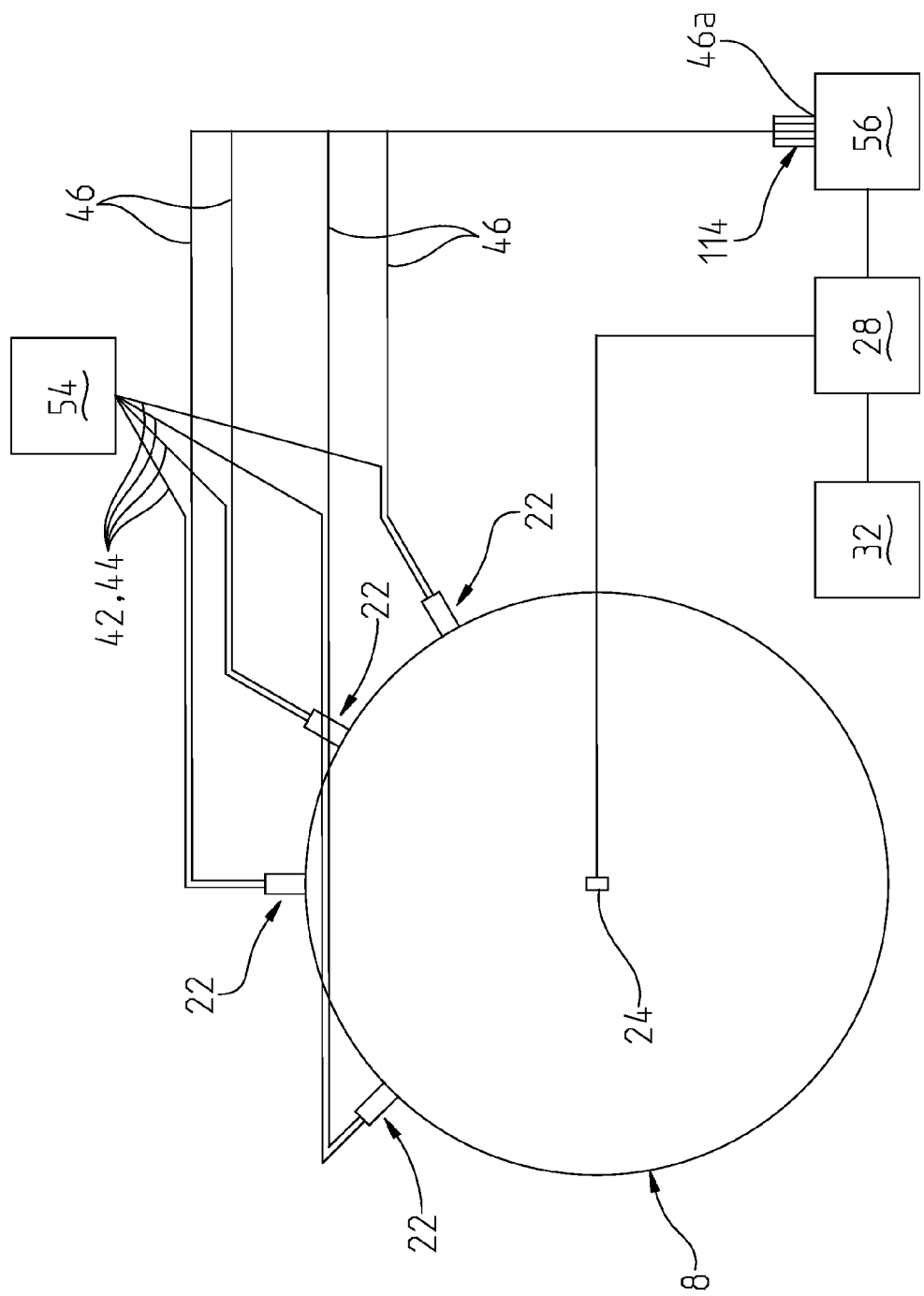
FIG. 9 is a diagrammatic view illustrating a turbine including a blade vibration monitor system utilizing a plurality of the imaging fiber optic ribbon probes.

Referring to FIG. 9, an embodiment of the invention is illustrated in which multiple probes 22 (four probes 22 shown) are located in circumferentially spaced relation around the turbine 8, and may comprise probes to sense multiple passing events for a single row of turbine blades, e.g., compressor blades, or for sensing multiple rows of blades. The probes 22 may all receiving light from a common light source 54 through respective paired illumination conduits 42, 44. Light signals received at each of the probes 22 may be conveyed through respective imaging conduits 46 to a common sensor array 56 (CCD camera). The imaging ends 46a of the imaging conduits 46 form a stacked radiating array 114 directed to the sensor array 56. Each of the imaging ends 46a in the radiating array provide an image corresponding to reflected light signals received at each of the probes 22. The plural images from the imaging ends 46a are individually identified by a location on the sensor array 56, where each image is projected to a predetermined range of pixels on the sensor array 56 and corresponds to a particular imaging end 46a.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. In a turbine engine including a blade structure comprising a plurality of blades and blade tip target portions associated with the blades, and a casing surrounding the blade structure, a blade vibration monitor for monitoring blade vibration comprising:
   a light source;
   an illumination conduit having a transmission end for locating adjacent to an interior portion of the casing for projecting an image of the light source onto the blade structure in the turbine engine, the projected image comprising an axially elongated projected image;
   a processor for processing reflected light images from a blade tip target portion corresponding to a blade passing event;
   an imaging conduit comprising a receptor end defined by an array of light receptor channels, the receptor end being located adjacent an interior portion of the casing for receiving reflected light images from the blade tip target portions and having an axial component transverse to a movement path of the blades; and
   the processor including a sensor array having a plurality of array components for imaging locations of the light receptor channels corresponding to locations along the axially elongated projected image, the processor identifying axial locations on a blade during each blade passing event.

2. The blade vibration monitor as in claim 1, wherein the imaging conduit comprises a plurality of optical fibers defining the light receptor channels and forming the receptor end, and the imaging conduit defining an opposite radiating end located adjacent to the sensor array.

3. The blade vibration monitor as in claim 2, wherein the radiating end of the imaging conduit comprises optical fiber ends having one-to-one correspondence in number and location to corresponding ends of the optical fibers at the receptor end.

4. The blade vibration monitor as in claim 3, wherein the sensor array comprises a CCD array.

5. The blade vibration monitor as in claim 2, wherein the receptor end of the imaging conduit is formed in a narrow rectangular configuration defined by the plurality of optical fibers.

6. The blade vibration monitor as in claim 5, wherein the transmission end of the illumination conduit comprises a plurality of optical fibers formed in a narrow rectangular configuration and positioned adjacent to a side of the receptor end of the imaging conduit.

7. The blade vibration monitor as in claim 6, including a cylindrical lens for focusing light from the transmission end of the illumination conduit onto the blade tip target portions and for focusing light from the blade tip target portions onto the receptor end of the imaging conduit.

8. The blade vibration monitor as in claim 7, wherein the illumination conduit comprises a first illumination conduit, and including a second illumination conduit comprising a plurality of optical fibers defining a receptor end formed in substantially the same configuration as the first illumination conduit.

9. The blade vibration monitor as in claim 8, wherein the receptor end of the imaging conduit is located sandwiched between the transmission ends of the first and second illumination conduits.

10. In a turbine engine including a blade structure comprising a plurality of blades having blade tip target portion and supported for rotation, and a casing surrounding the blade structure, a method of providing a blade vibration monitor comprising:
    providing an illumination conduit connected to a light source and emitting a line of light into the casing to define an axially elongated image from the illumination conduit;
    passing the blade tip target portions along a path of travel through locations corresponding to the axially elongated projected image and forming reflected light images at locations on the blade tip target portions to define blade passing events;
    receiving the reflected light images at a receptor end of an imaging conduit defined by a plurality of optical fibers forming a receptor array, the reflected light corresponding to a plurality of locations along the axially elongated projected image as each blade tip target portion moves past the line of light;
    conveying the reflected light images through the imaging conduit from the receptor array to an imaging array at an imaging end of the imaging conduit; and
    imaging the reflected light images from the imaging array onto a sensor array for identification of axial and tangential locations of at least one predetermined point on the blade tip target portions.

11. The method as in claim 10, including determining an orbital movement of each of the blades using the axial and tangential locations identified from a plurality of rotations of the blade structure.

12. The method as in claim 10, wherein the at least one predetermined point is identified as a point located a predetermined distance from a sensed leading edge or trailing edge of the blade tip target portion.

13. The method as in claim 10, wherein the receptor and imaging ends of the imaging conduit are formed into substantially similar rectangular optical arrays, and including passing the blade tip target portions along a path of travel corresponding to the axially elongated projected image to cause reflected light images to scan along a length of the receptor end.

14. The method as in claim 13, wherein the sensor array comprises a CCD array and wherein the images provided from the imaging array comprise a scanned image on the CCD array for each passage of a blade tip target portion.

15. The method as in claim 10, including a plurality of imaging conduits having respective receptor arrays located at circumferentially spaced locations around the casing and including respective imaging arrays located adjacent to the sensor array for imaging reflected images from different locations to the sensor array.

16. In a turbine engine including a blade structure comprising a plurality of blades having blade tip target portions, and a casing surrounding the blade structure, a method of providing a blade vibration monitor comprising:
    continuously winding a strand of optical fiber about a support structure, forming a plurality of windings in contact with each other;

adhering the plurality of windings to one another along a predetermined length of the windings to define an adhered section of optical fibers;

severing the adhered section of optical fibers transverse to the length of the optical fibers at a location intermediate the ends of the predetermined length to form severed ends, one of the severed ends defining a receptor end;

locating the receptor end adjacent to an interior portion of the casing; and locating an imaging end of the optical fibers, opposite the receptor end, at a processor for detecting light received at the receptor end.

17. The method as in claim 16, wherein the imaging end comprises one of the severed ends formed at the adhered section.

18. The method as in claim 16, including providing an illumination conduit connected to a light source and emitting a line of light into the casing to define an axially elongated image from the illumination conduit.

19. The method as in claim 18, wherein the receptor and imaging ends of the optical fibers are formed into substantially similar rectangular optical arrays, and including passing the blade tip target portions along a path of travel corresponding to the axially elongated projected image to cause reflected light images to scan along a length of the receptor end.

20. The method as in claim 19, wherein the processor comprises a CCD array and including radiating light images, corresponding to reflected light images, from the imaging end onto the CCD array to provide a scanned image on the CCD array for each passage of a blade tip target portion.

* * * * *